United States Patent [19]
Tanner et al.

[11] Patent Number: 5,246,534
[45] Date of Patent: Sep. 21, 1993

[54] APPARATUS FOR END FACE WELDING OF PLASTIC PARTS

[75] Inventors: Ernst Tanner, Neuhausen a. Rhf.; Jörg Wermelinger, Schaffhausen, both of Switzerland; Theo Gassner, Triesenberg, Liechtenstein

[73] Assignee: Georg Fischer Rohrleitungssysteme AG, Schaffhausen, Switzerland

[21] Appl. No.: 973,475

[22] Filed: Nov. 9, 1992

[30] Foreign Application Priority Data

Nov. 11, 1991 [CH] Switzerland ............... 03279/91

[51] Int. Cl.⁵ .................................... B29C 65/00
[52] U.S. Cl. ........................ 156/499; 156/304.2; 156/304.6; 156/503; 156/580
[58] Field of Search .............. 156/158, 304.1, 304.2, 156/304.6, 497, 499, 557, 580, 503

[56] References Cited

U.S. PATENT DOCUMENTS 4,933,036  6/1990  Shaposka et al. ............ 156/158
4,995,935  2/1991  Ganzberger ................. 156/304.6

Primary Examiner—David A. Simmons
Assistant Examiner—James J. Engel, Jr.
Attorney, Agent, or Firm—Akoo-Toren

[57] ABSTRACT

An apparatus for end face welding of plastic parts that includes two spaces clamping devices for retaining the plastic parts, a heating device movable into an operative position between the clamping devices, and a stop element for retaining the heating device in its operating position, and in which the stop element is automatically disengaged from the heating device upon a return movement of a carriage supporting one of the clamping devices after heating of the ends of the parts to enable automatic return of the heating device to its initial position.

10 Claims, 2 Drawing Sheets

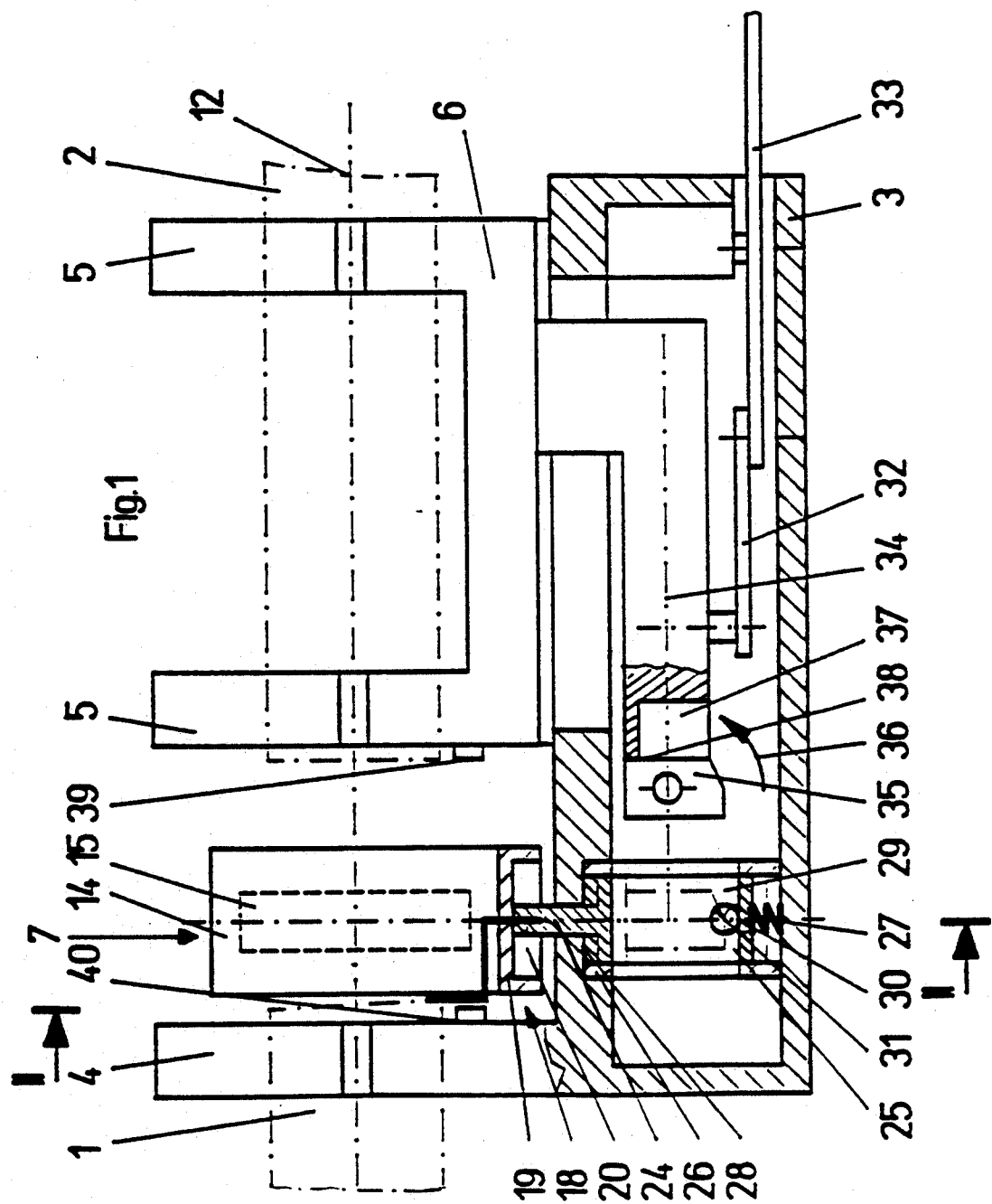

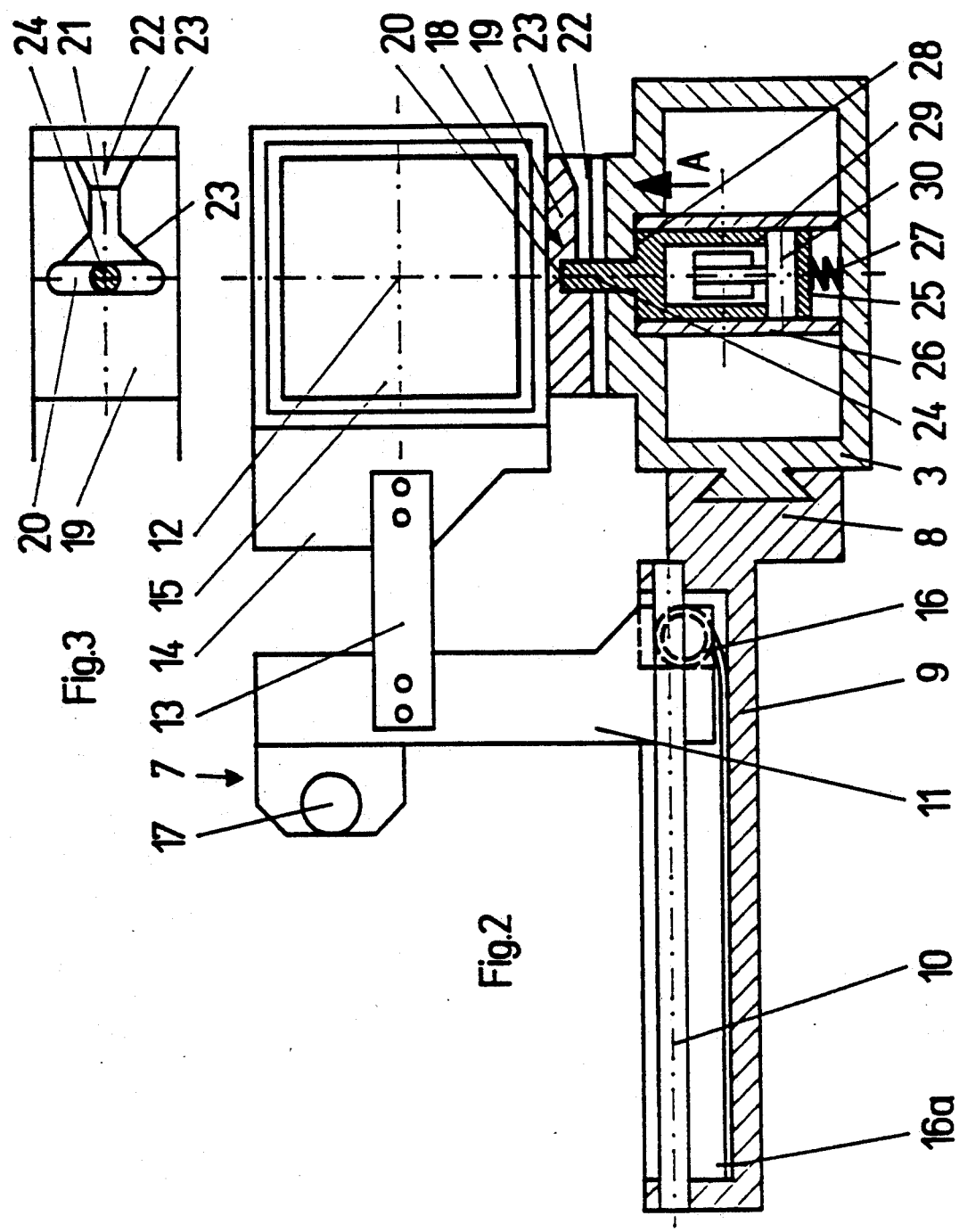

4,246,534

APPARATUS FOR END FACE WELDING OF PLASTIC PARTS

BACKGROUND OF THE INVENTION

The present invention relates to an apparatus for end face welding of plastic parts and which includes part retaining clamping devices at least one of which is mounted on a displaceable carriage, and a heating device movable between the clamping devices for contactless heating of the ends of the plastic parts.

EP-A2-0167870 discloses a hand-held apparatus of the above-mentioned type that can be used only for welding tubular parts having a small diameter. An error-free operation of this apparatus for obtaining substantially faultless welds is hardly possible because both welded parts are displaced by clamping devices toward each other while the heating device still moves therebetween. Besides, the displacement time of the heating device depends on the operator's skill, so that maintaining a substantially constant welding temperature which is necessary for obtaining a good weld is not always guaranteed.

Accordingly, the object of the invention is a welding apparatus of the above-mentioned type that insures a substantially faultless welding despite a manual operation thereof.

SUMMARY OF THE INVENTION

According to the invention, there is provided an apparatus for end face welding of tubular plastic parts in which the heating device, in an operating position, is retained between the clamping devices by a stop element which is so operatively connected with the displaceable carriage that, upon return movement of the carriage, the stop element is disengaged from the heating device which is then automatically brought into its initial position. Thus, due to the automatic disengagement of the stop element from the heating device upon return movement of the clamping device after expiration of the heating time, the heating device moves automatically from the region between the clamping devices, and rapid movement of the heated ends of the parts toward each other for their welding becomes possible. Thereby, an error-prone operation of the apparatus is prevented.

Advantageously, automatic return of the heating device after disengagement of the stop element is effected by spring forces.

BRIEF DESCRIPTION OF THE DRAWINGS

The present invention both as to its construction so to its mode of operation will be best understood from the following detailed description of the preferred embodiment when read with reference to the accompanying drawings, wherein:

FIG. 1 is a partially cross-sectional side view of an apparatus for end face welding of plastic parts according to the invention;

FIG. 2 is a sectional view along lines II—II in FIG. 1; and

FIG. 3 is a partial view in the direction of arrow A in FIG. 2.

DETAILED DESCRIPTION OF THE PREFERRED EMBODIMENT

An apparatus for end face welding of tubular plastic parts 1,2, e.g., tubes or fittings, which is shown in FIG. 1, comprises a base stand 3, a first clamping device 4 fixedly mounted on the base stand 3, a second clamping device 5 axially displaceable along the base stand 3 on a carriage 6, and a heating device 7 arranged between the clamping devices 4 and 5. The heating device 7, as shown in FIG. 2, is removably secured to the side of the base stand 3 with a fastening device 8.

The heating device 7 includes a guide body 9 provided with a linear guide 10 that enables displacement of a slide 11 on the guide body 9 transverse to the longitudinal axis 12 of the tubular part. Leaf springs 13 secure a frame member 14, which supports an electrically heatable heating plate 15, to the slide 11. The slide 11 is equipped with a winding and unwinding helical spring band 16, an end 16a of which is secured to the guide body 9.

The heating plate 15 is moved into a heating position shown in FIG. 2, with a handle 17 arranged on the slide 11, and is retained there by a stop element 18 provided with a plate 19 arranged on the bottom side of the frame member 14. As shown in FIG. 3, the plate 19 has a groove 20 that extends transverse to the displacement direction of the heating device 7 and is connected with a less deep groove 21 extending in the displacement direction. The entry opening 22 of the groove 21 has a chamfer 23.

Upon displacement of the heating device 7 to an operating position, the groove 21 slides past a vertical displaceable bolt 24 of the stop element 18 extendable in the base stand 3 until the bolt 24 rests in the deeper groove 20. The bolt 24 is fixedly connected with a pressure member 25 movable in a sleeve 26 arranged in the base stand 3. The pressure member 25 is biased upward against a stop surface 28 by a pressure spring 27. The pressure member 25 has a cavity 29 in which a transverse bolt 30 is located. The bolt 30 forms a stop surface 31.

As shown in FIG. 1, a toggle system 32 operatively connects the carriage 6 with a hand lever 33. Upon actuation of the lever 33, a slider 34 connected with the carriage 6 moves in the direction of the longitudinal axis 12. A cam 35 pivotally arranged at one end of the slider 34 is displaceable in the direction of an arrow 36 in a cavity 37 of the slider 34 and is retained by a stop surface 38 upon its displacement in the opposite direction.

For heating the ends of the tubular parts 1 and 2, the heating device is manually displaced against the tensile force of the spring band 16 between the two clamping devices 4 and 5 until it is locked by engagement of the bolt 24 in the groove 20. Initially, the clamping device 5 is manually displaced with the hand lever 33 until a stop boss 39 engages the heating device 7 and with which the heating device 7 is slightly moved until the other side of the heating device 7 comes into contact with a stop boss 40 of the clamping device 4. In this position, the ends of the tubular parts 1 and 2 are located from heat emitting surfaces of the heating plate 15 at a small predetermined distance necessary for rapid contactless heating of the ends. The freedom of movement of the heating plate 15 in the direction of the longitudinal axis 12 is assured by a corresponding length of the groove 20 and respective displaceable mounting of the heating plate 15 with the leaf springs 13.

Upon displacement of the carriage 6, the cam 35, together with the slider 34, is displaced by the pressure member 25 which provides for pivotal movement of the cam 35 in the direction of the arrow 36 by the transverse bolt 30, so that there is no weakening of the locking of the bolt 24 in the groove 20. Upon expiration of the heating time which can be determined, e.g., by optical means, the carriage 6 is displaced with the hand lever 33 to its non-operating position whereby the cam 35 hits the stop surface 31 of the transverse bolt 30, so that the pressure member 25, together with the bolt 24, moves downward against the bias of the spring 27, and the stop element 18 disengages from the heating device 7. The slide 11 is returned to its initial position by the tensile force of the helicoidal spring band 16, so that sidewise displacement of the frame member 14 with the heating plate 15 is prevented by the shift of the bolt 24 into the groove 21. Thus, a contact between the heating plate 15 and the ends of the tubular parts is not possible.

Because of rapid and automatic return of the heating device 7, it can be immediately moved again toward the clamping device 4 after return movement of the carriage 6, so that, after a minimal time interval and without any significant cooling of the tube ends, they can be pressed to each other for welding.

While a particular embodiment of the invention has been shown and described, various modifications thereof will be apparent to those skilled in the art and, therefore, it is intended that the invention be limited to the disclosed embodiment or to the details thereof, and departures may be made therefrom within the spirit and scope of the invention as defined in the appended claims.

What is claimed is:

1. An apparatus for end face welding of plastic parts, comprising two spaced clamping devices for retaining the plastic parts; a displaceable carriage for supporting at least one of said clamping devices; a heating device locatable between said clamping devices for contactless heating of ends of the plastic parts; and stop means for retaining said heating device between said clamping devices in a predetermined position, said stop means being operatively connected with said carriage in such a manner that return movement of said carriage causes disengagement of said stop means from said heating means to enable automatic return of said heating device to an initial position thereof.

2. An apparatus as set forth in claim 1, further comprising spring means for displacing said heating means to the initial position thereof.

3. An apparatus as set forth in claim 1, wherein said heating device includes a groove, said stop means including a spring-biased bolt lockable in said groove for retaining said heating device in the predetermined position between said clamping devices.

4. An apparatus as set forth in claim 3, wherein said groove extends transverse to a displacement direction of said heating device, said heating device further including a less deep groove extending in the displacement direction of said heating device, connected with said groove and having an entry opening with a chamfer.

5. An apparatus as set forth in claim 3, further comprising a base stand; and pressure means displaceable in said base stand, supporting said bolt and defining a stop surface, said carriage being associated with a cam displaceable therewith and engageable with said stop surface.

6. An apparatus as set forth in claim 5, wherein said cam is pivotally arranged on said carriage and engages said stop surface of said pressure means only during the return movement of said carriage to effect lowering of said bolt against the spring bias.

7. An apparatus as set forth in claim 2, wherein said spring means comprises a winding and unwinding helicoidal spring band.

8. An apparatus as set forth in claim 1, wherein said heating device comprises a linear guide, a slide displaceable on said linear guide, a heating plate, and leaf spring means for movably mounting said heating plate on said slide for displacement in a direction transverse to the displacement direction of said slide.

9. An apparatus for end face welding of plastic parts, comprising spaced first and second clamping devices for retaining the plastic parts; a displaceable carriage for supporting at least one of said first and second clamping devices; a heating device for contactless heating of ends of the plastic parts; means for displacing said heating device from an initial position thereof to an operative position between said first and second clamping devices; stop means for retaining said heating device in the operative position thereof; means operatively connecting said stop means with said carriage for disengaging said stop means from said heating device upon return movement of said carriage to an initial position of said carriage; and means for automatically returning said heating device to the initial position thereof upon disengagement of said stop means therefrom.

10. An apparatus as set forth in claim 9, wherein said returning means comprises helicoidal winding and unwinding spring means.

* * * * *